(12) United States Patent
Yuan et al.

(10) Patent No.: US 8,526,276 B2
(45) Date of Patent: Sep. 3, 2013

(54) OPTICAL DISK DRIVE CAPABLE OF REDUCING POWER CONSUMPTION

(71) Applicant: Lenovo (Beijing) Limited, Beijing (CN)

(72) Inventors: Dalong Yuan, Beijing (CN); Xiaogang Wang, Beijing (CN); Xianqun Yi, Beijing (CN)

(73) Assignee: Lenovo (Beijing) Limited, Beijing (KR)

( * ) Notice: Subject to any disclaimer, the term of this patent is extended or adjusted under 35 U.S.C. 154(b) by 0 days.

(21) Appl. No.: 13/725,082

(22) Filed: Dec. 21, 2012

(65) Prior Publication Data

US 2013/0111233 A1 May 2, 2013

Related U.S. Application Data

(62) Division of application No. 12/683,241, filed on Jan. 6, 2010, now Pat. No. 8,385,164.

(30) Foreign Application Priority Data

Feb. 1, 2009 (CN) .......................... 2009 1 0077616

(51) Int. Cl.
*G11B 21/08* (2006.01)

(52) U.S. Cl.
USPC ....................... 369/30.27; 369/53.42; 713/324

(58) Field of Classification Search
USPC .............. 369/30.27, 53.1, 53.2, 53.41, 53.42, 369/47.44; 713/300, 320, 324, 330, 340
See application file for complete search history.

(56) References Cited

U.S. PATENT DOCUMENTS

| | | | | |
|---|---|---|---|---|
| 7,177,238 B2* | 2/2007 | Huang | ......... | 369/30.16 |
| 7,278,146 B2* | 10/2007 | Yoo | ................. | 720/610 |
| 7,673,159 B2* | 3/2010 | Aoyagi et al. | ................. | 713/310 |
| 7,836,319 B2* | 11/2010 | Oh et al. | ........................ | 713/323 |
| 2004/0218513 A1* | 11/2004 | Wu | ................. | 369/292 |
| 2005/0152246 A1* | 7/2005 | Li et al. | ....................... | 369/47.44 |
| 2006/0236015 A1* | 10/2006 | Tsuji | .............................. | 710/303 |
| 2008/0235715 A1* | 9/2008 | Washiya et al. | ................. | 720/601 |
| 2010/0246351 A1* | 9/2010 | Yamazaki et al. | ............ | 369/53.2 |
| 2012/0066527 A1* | 3/2012 | Mizuura | ........................ | 713/320 |
| 2012/0066700 A1* | 3/2012 | Andou et al. | ................. | 720/606 |
| 2012/0084800 A1* | 4/2012 | Hara et al. | .................... | 720/601 |

\* cited by examiner

*Primary Examiner* — Tan X Dinh
(74) *Attorney, Agent, or Firm* — Osha Liang LLP

(57) ABSTRACT

The present invention provides an optical disc drive and computer. The optical disc drive comprises: a tray for laying a disc therein; a drive means connected to the tray; and a control circuit for connecting the drive means and a power supply of a computer connected to the optical disc drive, wherein the drive means establishes an electrical connection with the power supply via the control circuit. The control circuit comprises: a determination unit for determining whether a optical disc drive power-off condition is valid and acquiring a determination result; and a power supply control unit for transmitting a power-off instruction to a computer host when the determination result indicates that the optical disc drive power-off condition is valid. The power-off instruction is configured for instructing the computer to control the power supply to stop supplying power to the control circuit and the drive means. The present invention enables complete power-off of the optical disc drive so that electrical power consumption is reduced to a maximum degree.

2 Claims, 1 Drawing Sheet

OPTICAL DISK DRIVE CAPABLE OF REDUCING POWER CONSUMPTION

CROSS REFERENCE TO RELATED APPLICATIONS

This is a divisional application and claims the benefit, under 35 U.S.C. §120, of U.S. patent application Ser. No. 12/683,241 filed on Jan. 6, 2010, which claims the priority under 35 U.S.C. §119 of Chinese patent application No. 200910077616.8 filed on Feb. 1, 2009. These prior applications are hereby incorporated by reference in their entireties.

BACKGROUND OF THE INVENTION

1. Field of the Invention

The present invention relates to an optical disc drive technique, and particularly to an optical disc drive and computer.

2. Description of Prior Art

As the standard of living is improved increasingly, consumption of electric power is increasing. At present, provision of the electric power does not meet demand due to the ever-increasing electric power consumption in various fields. Therefore, it is necessary to improve use efficiency of the electric power.

However, a waste of electric power in the field of computer is considerably is surprising. Therefore, it is necessary to improve power utilization efficiency of the computer.

The computer is composed of a plurality of power consumption components such as a CPU, a display card, an optical disc drive, etc. As part of the computer, the optical disc drive should improve its power utilization efficiency.

In order to improve the power utilization efficiency of the optical disc drive device, various power supply control methods for the optical disc drive device are provided in prior art. However, the inventor of the present invention discovered that various power supply control methods for the optical disc drive in prior art have at least the following disadvantage.

Various power supply control methods for the optical disc drive in prior art are based on the control of power supply of modules inside the optical disc drive. However, some necessary modules (e.g., a microcontroller in the optical disc drive) are always in a power consumption state. Therefore, the improvement in the power utilization efficiency of the optical disc drive needs to be further improved.

SUMMARY OF THE INVENTION

It is an object of embodiments of the present invention to provide an optical disc drive and computer for improving power utilization efficiency of the optical disc drive.

To achieve the above object, in an embodiment of the present invention, an optical disc drive is provided, comprising:
   a tray for laying a disc therein;
   a drive means connected to the tray; and
   a control circuit for connecting the drive means and a power supply of a computer connected to the optical disc drive, wherein the drive means establishes an electrical connection with the power supply via the control circuit;
   the control circuit comprises:
   a determination unit for determining whether an optical disc drive power-off condition is valid and acquiring a determination result; and
   a power supply control unit for transmitting a power-off instruction to a computer host when the determination result indicates that the optical disc drive power-off condition is valid, the power-off instruction is configured for instructing the computer to control the power supply to stop supplying power to the control circuit and the drive means.

The above optical disc drive is provided, wherein the control circuit further comprises a first reserved pin, and the power supply control unit is specifically:
   a level control unit for generating the power-off instruction by changing a level of the first reserved pin from a first level to a second level when the determination result indicates that the optical disc drive power-off condition is valid.

The above optical disc drive is provided, wherein the control circuit further comprises an optical disc drive power supply pin electrically connected to the power supply, and the power-off instruction is specifically configured for instructing the computer host to control the power supply to stop supplying power to the optical disc drive power supply pin.

The above optical disc drive is provided, wherein the determination unit and the level control unit are implemented in firmware.

The above optical disc drive is provided, wherein the control circuit further comprises:
   a power-off determination pin with one end electrically connected to the first reserved pin of the reserved pins and the other end electrically connected to a power-off signal reception pin arranged in the computer host; and
   a first resistor with one end provided with a first positive voltage and the other end connected between the power-off determination pin and the first reserved pin;
   the level control unit is specifically a low level setting unit for setting the level of the first reserved pin to a low level when the determination result indicates that the optical disc drive power-off condition is valid, wherein
   the first level is a high level and the second level is a low level.

The above optical disc drive is provided, wherein the control circuit further comprises:
   a second reserved pin;
   a power-on determination pin with one end electrically connected to the second reserved pin and the other end electrically connected to a power-on signal reception pin of a computer chip;
   a second resistor with one end provided with a second positive voltage and the other end connected between the power-on determination pin and the second reserved pin; and
   a switch connected between the second reserved pin and a grounding pin;
   the optical disc drive further comprises:
   a key, wherein when the key is released, the switch switches off the path between the second reserved pin and the grounding pin, and when the key is pressed, the switch switches on the path between the second reserved pin and the grounding pin and instructs the computer host to control the external power supply to supply power to the optical disc drive power supply pin.

To solve the above object, in an embodiment of the present invention, a computer is also provided, comprising:
   a power supply for supplying power to the optical disc drive comprising a drive means, a tray for laying a disc therein and a control circuit connected to the drive means, wherein the drive means establishes an electrical connection with the power supply via the control circuit; and
   a power-off control module for controlling the power supply to stop supplying power to the control circuit and the drive means after receiving a power-off instruction indicating that the optical disc drive power-off condition is valid. The optical disc drive power-off condition is that no disc exists in the tray or the disc is not operated by the computer.

The above computer is provided, further comprising:

a power-off condition determination module for determining whether the optical disc drive power-off condition is valid and acquiring a first determination result; and transmitting the power-off instruction to the power-off control module when the determination result indicates that the optical disc drive power-off condition is valid.

The above computer is provided, wherein:

the control circuit comprises a first reserved pin, and a level of the first reserved pin is set to a second level by an optical disc drive firmware when the optical disc drive power-off condition is valid;

the computer further comprises:

a first pin level detection module for detecting level information of the first reserved pin of the optical disc drive, and transmitting the power-off instruction to the power-off control module when the level of the first reserved pin is the second level.

The above computer is provided, wherein:

the control circuit further comprises:

a power-off determination pin with one end electrically connected to the first reserved pin of the reserved pins and the other end electrically connected to a power-off signal reception pin arranged in the computer host; and a first resistor with one end provided with a first positive voltage and the other end connected between the power-off determination pin and the first reserved pin;

the level control unit is specifically a low level setting unit for setting the level of the first reserved pin to a low level when the determination result indicates that the optical disc drive power-off condition is valid;

the first level is a high level and the second level is a low level;

the computer further comprises:

a power-off signal reception pin electrically connected to the first reserved pin via the power-off determination pin;

the first pin level detection module acquires a level detection result specifically based on a level of the power-off signal reception pin.

The above computer is provided, wherein the first pin level detection module is specifically:

a first invoking unit for invoking a basis input/output system to read level information of the power-off signal reception pin and acquiring a first level detection result.

The above computer is provided, wherein the first pin level detection module is specifically:

a level detection unit for detecting the level of the power-off signal reception pin;

a second invoking unit for invoking an ASL code of the basic input/output system to complete a driving notification operation when the level of the power-off signal reception pin is the second level; and an event detection unit for generating the first level detection result indicating that the level of the first reserved pin is the second level when detecting a driving notification event.

The above computer is provided, further comprising:

an optical disc drive usage detection module for detecting whether the optical disc drive needs to be used and acquiring a usage detection result; and a power-on control module for controlling the power supply to supply power to the control circuit and the drive means when the usage detection result indicates that the optical disc drive needs to be used.

The above computer is provided, wherein the optical disc drive usage to detection module is specifically:

a first monitoring unit for monitoring an event of operating the optical disc drive by using a hook technique, and generating the usage detection result indicating that the optical disc drive needs to be used when the event of operating the optical disc drive is detected; or a virtual optical disc drive generation unit for generating a button representing a virtual optical disc drive after power supply to the optical disc drive power supply pin is stopped; and a second monitoring unit for generating the usage detection result indicating that the optical disc drive needs to be used, when the button is clicked.

The above computer is provided, wherein:

the control circuit further comprises:

a second reserved pin;

a power-on determination pin with one end electrically connected to the second reserved pin and the other end electrically connected to a power-on signal reception pin of a computer chip;

a second resistor with one end provided with a second positive voltage and the other end connected between the power-on determination pin and the second reserved pin; and a switch connected between the second reserved pin and a grounding pin;

the optical disc drive further comprises:

a key, wherein when the key is released, the switch switches off the path between the second reserved pin and the grounding pin, and when the key is pressed, the switch switches on the path between the second reserved pin and the grounding pin;

the computer further comprises:

a second pin level detection module for detecting level information of the power-on determination pin of the optical disc drive and acquiring a second level detection result; and a power-on control module for controlling the power supply to supply power to the control circuit and the drive means when the second level detection result indicates that a level of the power-on determination pin is a low level.

To achieve the above object, in an embodiment of the present invention, an optical disc drive is also provided, comprising:

a tray for laying a disc therein;

a drive means connected to the tray; and a control circuit for connecting the drive means and a power supply of a computer connected to the optical disc drive, wherein the drive means establishes an electrical connection with the external power supply via the control circuit;

the control circuit comprises:

a second reserved pin;

a power-on determination pin with one end electrically connected to the second reserved pin and the other end electrically connected to a power-on signal reception pin configured on a chip of the computer;

a second resistor with one end provided with a second positive voltage and the other end connected between the power-on determination pin and the second reserved pin; and a switch connected between the second reserved pin and a grounding pin;

the optical disc drive further comprises:

a key, wherein when the key is released, the switch switches off the path between the second reserved pin and the grounding pin, and when the key is pressed, the switch switches on the path between the second reserved pin and the grounding pin and instructs the computer to control the external power supply to supply power to the optical disc drive power supply pin.

To achieve the above object, in an embodiment of the present invention, a computer is also provided, comprising:

a power supply for supplying power to the optical disc drive comprising a drive means and a control circuit, wherein the drive means establishes an electrical connection with the power supply via the control circuit;

a optical disc drive usage detection module for detecting whether the optical disc drive needs to be used and acquiring a usage detection result; and a power-on control module for controlling the power supply to supply power to the control circuit and the drive means when the usage detection result indicates that the optical disc drive needs to be used.

The above computer is provided, wherein the optical disc drive usage detection module is specifically:

a first monitoring unit for detecting an event of operating the optical disc drive by using a hook technique, and generating the usage detection result indicating that the optical disc drive needs to be used when the event of operating the optical disc drive is detected.

The above computer is provided, wherein the optical disc drive usage detection module is specifically:

a virtual optical disc drive generation unit for generating a button representing a virtual optical disc drive after power supply to the optical disc drive power supply pin is stopped; and a second monitoring unit for generating the usage detection result indicating that the optical disc drive needs to be used, when the button is clicked.

To solve the above object, in an embodiment of the present invention, a computer is also provided, comprising:

a power supply for supplying power to the optical disc drive comprising a drive means and a control circuit, wherein the drive means establishes an electrical connection with the power supply via the control circuit;

the control circuit comprises:

a second reserved pin;

a power-on determination pin with one end electrically connected to the second reserved pin and the other end electrically connected to a power-on signal reception pin on a chip of a host;

a second resistor with one end provided with a second positive voltage and the other end connected between the power-on determination pin and the second reserved pin; and a switch connected between the second reserved pin and a grounding pin;

the optical disc drive further comprises:

a key, wherein when the key is released, the switch switches off the path between the second reserved pin and the grounding pin, and when the key is pressed, the switch switches on the path between the second reserved pin and the grounding pin;

the computer further comprises:

a second pin level detection module for detecting level information of the power-on determination pin of the optical disc drive and acquiring a second level detection result; and a power-on control module for controlling the power supply to supply power to the control circuit and the drive means when the second level detection result indicates that a level of the power-on determination pin is a low level.

The embodiments of the present invention have the following useful advantages.

1. In the apparatus according to the embodiments of the present invention, when the power-off condition is valid, the power supply stops supplying power to the optical disc drive power supply pin so that the entire optical disc drive is in a no power state. Electric power consumption is reduced to a maximum degree.

2. Since determination of the power-off condition is done by the firmware, the determination can also be performed in the case that the disc is contained in the optical disc drive but is not accessed. Therefore, it is more widely used.

3. Since determination of the power-off condition is done by the firmware, it is avoided that a complicated and time-consuming determination operation is done at the system end. Therefore, the complexity of development and the load of CPU are reduced, and power consumption is further reduced.

4. The control of automatic power-on is provided to increase availability, and it is consistent with a conventional custom of using the optical disc drive.

DETAILED DESCRIPTION OF PREFERRED EMBODIMENTS

Figure 1:
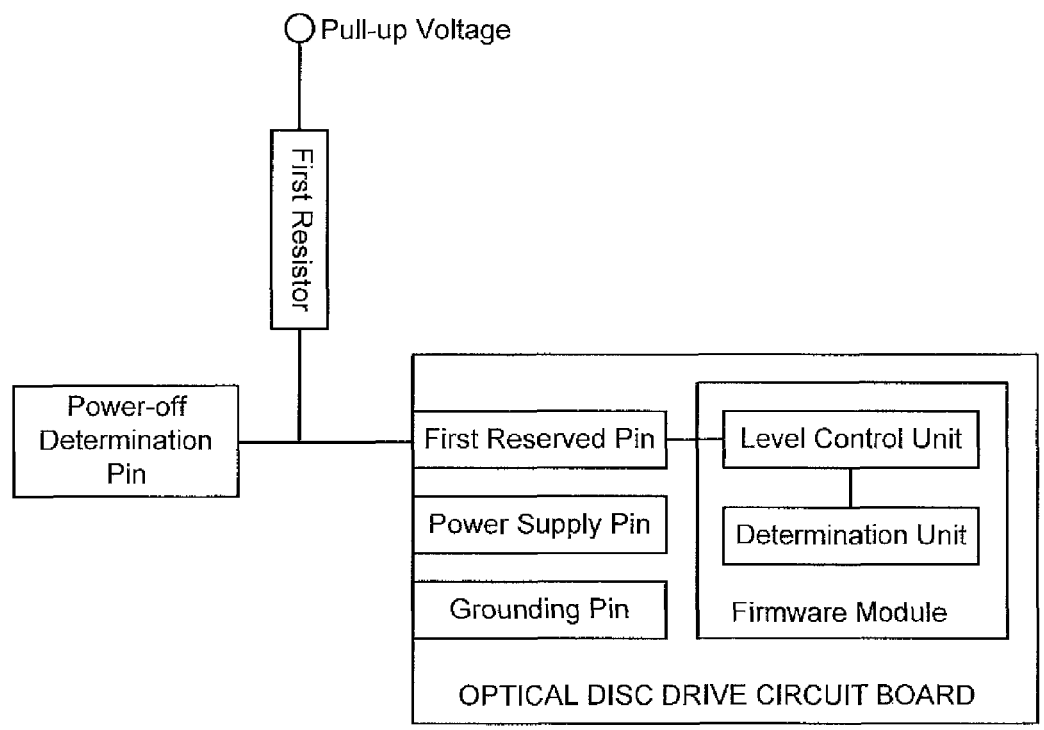
FIG. 1 is a schematic diagram illustrating a structure of an optical disc drive according to an embodiment of the present invention.
Figure 2:
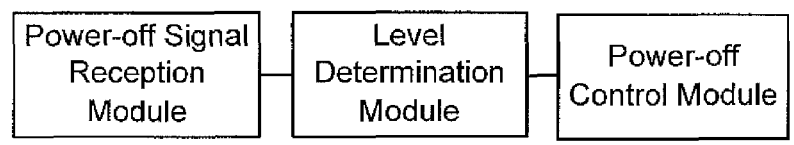
FIG. 2 is a schematic diagram illustrating a structure of a computer according to an embodiment of the present invention.

In an optical disc drive and computer according to the embodiments of the present invention, when operation parameters of the optical disc drive meet a power-off condition, it directly stops supplying power to a power supply input pin of the optical disc drive so that the entire optical disc drive, instead of some modules is inside the optical disc drive, is in a power-off state. Thus, power utilization efficiency of the optical disc drive is improved. When a power-on condition is met, power is resupplied to the optical disc drive.

The optical disc drive according to the embodiment of the present invention comprises:

a tray for laying a disc therein;

a drive means connected to the tray; and a control circuit for connecting the drive means and a power supply of a computer connected to the optical disc drive, wherein the drive means establishes an electrical connection with the power supply via the control circuit;

the control circuit comprises:

a determination unit for determining whether a optical disc drive power-off condition is valid and acquiring a determination result; and a power supply control unit for transmitting a power-off instruction to a computer host when the determination result indicates that the optical disc drive power-off condition is valid, the power-off instruction is configured for instructing the computer to control the power supply to stop supplying power to the control circuit and the drive means.

The embodiment of the present invention will be described below in more details.

In general, the optical disc drive comprises an optical disc drive circuit board on which one or more data transmission pins, one or more grounding pins, an optical disc drive power supply pin electrically connected to a host power supply pin on a main board of the computer, a first reserved pin and a control module are configured. If all of them need to be powered off, a host power supply of the computer, which supplies power to the optical disc drive through the host power supply pin and the optical disc drive power supply pin) is stopped from supplying power to the optical disc drive power supply pin.

Therefore, the power supply control unit can be implemented by the following units configured in the control module:

a determination unit for determining whether the optical disc drive power-off condition is valid; and a power supply control unit for changing a level of the first reserved pin from a first level to a second level when the determination unit determines that the optical disc drive power-off condition is valid, in order to generate the power-off instruction for instructing the computer to control the power supply to stop supplying power to the control circuit and the drive means.

That is, when the optical disc drive power-off condition is not valid, the level of the first reserved pin is the first level. When the level of the first reserved pin is the second level, the optical disc drive power supply pin is stopped from being supplied with power.

In the embodiment, the computer is instructed to control the power supply to stop supplying power to the control circuit and the drive means by means of changing the level. It should be appreciated that an instruction can be transmitted to the computer via a data line, for instructing the computer to control the power supply to stop supplying power to the control circuit and the drive means. That is, it is sufficient for implementing the present invention that the host computer can be instructed to control the power supply to stop supplying power to the control circuit and the drive means.

The computer according to an embodiment of the present invention comprises:

a power supply for supplying power to the optical disc drive comprising a drive means and a control circuit, wherein the drive means establishes an electrical connection with the power supply via the control circuit; and a power-off control module for controlling the power supply to stop supplying power to the control circuit and the drive means after receiving a power-off instruction indicating that the optical disc drive power-off condition is valid.

The computer will be described below with reference to different components for determining different power-off conditions.

In a first implementation, whether the power-off condition is valid is determined by the optical disc drive. The computer comprises:

a power-off signal reception module for acquiring a level of the first reserved pin of the optical disc drive; and a power supply control module for controlling the host power supply pin to stop supplying power to the optical disc drive power supply pin when the level of the first reserved pin is the second level.

In a specific embodiment of the present invention, the first level is a high level and the second level is a low level. It is of course possible that the first level is a low level and the second level is a high level. The embodiment of the present invention will be described below in detail in the case that the first level is a high level and the second level is a low level.

The optical disc drive according to the embodiment of the present invention comprises an optical disc drive circuit board on which one or more data transmission pins, one or more grounding pins, an optical disc drive power supply pin electrically connected to a host power supply pin on a main board of the computer, one or more reserved pins and a firmware module are configured.

As shown in FIG. 1, the optical disc drive further comprises:

a power-off determination pin with one end electrically connected to the first reserved pin of the reserved pins and the other end electrically connected to a power-off signal reception pin of a computer chip. The computer chip can be an EC chip of a laptop computer, or it can be a south bridge chip of a main board of a computer, and of course it can be other chips having idle pins on the computer; and a first resistor with one end provided with a first positive voltage and the other end connected between the power-off determination pin and the first reserved pin.

The firmware module comprises:

a determination unit for determining whether the optical disc drive power-off condition is valid; and a level control unit for setting the level of the first reserved pin to a low level when the determination unit determines that the optical disc drive power-off condition is valid.

When a level of the power-off determination pin is a low level, the optical disc drive power supply pin is stopped from being supplied with power.

The power-off condition is that no disc exists in the tray of the optical disc drive or the disc is not operated by the computer connected to the optical disc drive (e.g., data or signal transmission between the optical disc drive and the host is stopped for a predetermined period of time, or idle time of the optical disc drive exceeds a predetermined period of time), etc.

The above optical disc drive will be described below in detail.

In a usual state, the power-off determination pin is in a high level, since the first resistor is provided with a pull-up voltage. Once the determination unit discovers that the optical disc drive power-off condition is valid (no disc exists in the tray of the optical disc drive or the disc is not operated by the computer, etc.), the level of the first reserved pin is set to a low level. Since the power-off determination pin is directly electrically connected to the first reserved pin, a level of the power-off determination pin is changed from a high level to a low level at this time.

Once the level of the power-off determination pin is a low level, which indicates that the optical disc drive can be powered off, the power supply can be controlled to stop supplying power to the optical disc drive power supply pin.

Since this optical disc drive power supply pin is stopped from being supplied with power, the entire optical disc drive is in a no power state. Electricity power consumption is thus reduced to a maximum degree.

The power supply control means will be described below in detail.

The optical disc drive power supply control means according to an embodiment of the present invention is configured for power supply control of the optical disc drive. This optical disc drive comprises an optical disc drive circuit board on which one or more data transmission pins, one or more grounding pins, an optical disc drive power supply pin electrically connected to a host power supply pin on a main board of the computer, one or more reserved pins and a firmware module are configured. The optical disc drive further comprises:

a power-off determination pin with one end electrically connected to the first reserved pin of the reserved pins and the other end electrically connected to a power-off signal reception pin of a computer chip. The computer chip can be an EC chip of a laptop computer, or it can be a south bridge of a main board of a computer, and of course it can be other chips having idle pins on the computer. In order to be better compliant with functions of the existing chips, for a laptop computer, the power-off determination pin thereof is preferably connected to the EC chip; and a first resistor with one end provided with a pull-up voltage and the other end connected between the power-off determination pin and the first reserved pin.

The firmware module comprises:

a determination unit for determining whether the optical disc drive power-off condition is valid; and a level control unit for setting the level of the first reserved pin to a low level when the determination unit determines that the optical disc drive power-off condition is valid.

The optical disc drive power supply control means comprises:

a first pin state detection module for detecting level information of the power-off determination pin and acquiring a detection result; and a power-off control module for controlling the host power supply pin to stop supplying power to the optical disc drive power supply pin when the detection result indicates the level of the power-off determination pin is a low level.

A south bridge is an important part of a chipset of a main board. The south bridge is not directly connected to a processor, but connected to a north bridge in a certain manner, which varies among different chipsets of different providers, e.g., Intel Hub Architecture of Intel and Multi-Threaded of SIS.

The south bridge is responsible for communication between I/O buses, e.g., an audio controller, a keyboard controller, a real-time clock controller, an advanced power management, etc. All of pins on the south bridge can be set by the BIOS (Basic Input/Output System).

Therefore, in a specific embodiment of the present invention, the power supply control module changes a state of the host power supply pin on the south bridge specifically by invoking the BIOS, so that the host power supply pin stops supplying power to the optical disc drive power supply pin to make the optical disc drive to be in a state of complete power-off.

Of course, the above description should not be construed to exclude the possibility that the host power supply pin is provided in other chips. The host power supply pin may also be provided in other chips in case of other types of main boards. That is, the optical disc drive power supply pin may also be connected to another chip, such that it can make the optical disc drive power-off by controlling states of the pin on the other chip connected to the optical disc drive power supply pin. Then the optical disc drive is in the state of complete power-off.

The pin state detection module can be implemented in an active manner or in a passive manner. The two manners are respectively described as follows.

In the active manner, the pin state detection module comprises:

a first invoking unit for invoking the BIOS to read level information of the power-off signal reception pin.

In the passive manner, the pin state detection module comprises:

a level detection unit configured in the computer chip (e.g., an EC, south bridge, etc.), for detecting the pin of the power-off signal reception pin;

a second invoking unit for invoking an ASL code of the BIOS to complete a driving notification operation (Notify-Driver) when the level of the power-off signal reception pin is a low level; and an event detection unit for generating the detection result indicating that the level of the power-off determination pin is a low level when detecting a driving notification event.

It can be seen from the above description that the embodiment of the present invention can implement complete power-off of the optical disc drive when the power-off condition is valid.

In an embodiment of the present invention, after the complete power-off of this optical disc drive, power-on can be performed in a manual manner. That is, when the user needs to power on the optical disc drive, the BIOS is directly invoked to change a state of the host power supply pin of the south bridge so that it starts supplying power to the optical disc drive power supply pin. However, in order to enable the user to obtain a better experience, the embodiment of the present invention also provides a manner of automatic power-on.

Therefore, the computer according to the embodiment of the present invention further comprises:

a optical disc drive usage detection module for detecting whether the optical disc drive needs to be used and acquiring a detection result; and a power-on control module for controlling the host power supply pin to start supplying power to the optical disc drive power supply pin when the usage detection result indicates that the optical disc drive needs to be used.

In the specific embodiment of the present invention, the optical disc drive usage detection module can be implemented in the following manner.

Interception of all of events of operating the optical disc drive can be performed by using a Windows SDK programmed hook technique. Therefore, the optical disc drive usage detection module according to an embodiment of the present invention specifically comprises:

a first monitoring unit for monitoring the event of operating the optical disc drive by using the hook technique, and generating the detection result indicating that the optical disc drive needs to be used when the event of operating the optical disc drive is detected.

The optical disc drive usage detection module according to an embodiment of the present invention further comprises:

a virtual optical disc drive generation unit for generating a button representing a virtual optical disc drive after power supply to the optical disc drive power supply pin is stopped; and a second monitoring unit for generating the detection result indicating that the optical disc drive needs to be used, when the button is clicked.

The above two manners of power-on control are both implemented by software, while the user should also be provided with an approach for implementing power-on control by hardware.

The optical disc drive according to an embodiment of the present invention further comprises:

a power-on determination pin with one end electrically connected to the second reserved pin of the reserved pins and the other end electrically connected to a power-on signal reception pin of a computer chip;

a second resistor with one end provided with a second positive voltage and the other end connected between the power-on determination pin and the second reserved pin. This computer chip can be an EC chip of a laptop computer, or it can be a south bridge of a main board of a computer, and of course it can be other chips having idle pins on the computer;

a switch connected between the second reserved pin and a grounding pin; and a key, wherein when the key is released, the switch switches off the path between the second reserved pin and the grounding pin, such that a level of the power-on determination pin is a high level, and when the key is pressed, the switch switches on the path between the second reserved pin and the grounding pin, such that a level of the power-on determination pin is a low level.

When the level of the power-on determination pin is a low level, the optical disc drive power supply pin is supplied with power.

The optical disc drive power supply control means comprises:

a second pin level detection module for detecting level information of the power-on determination pin and acquiring a detection result; and a power-on control module for controlling the host power supply pin to supply power to the optical disc drive power supply pin when the detection result indicates that a level of the power-on determination pin is a low level.

The manner in which the second pin level detection module acquires the level of the power-on determination pin is the same as the manner in which it acquires the level of the power-off determination pin, and the detailed description thereof is omitted herein.

The key can be a newly added key, and it can also be an existing key such as a pop-out key integrated on the optical disc drive.

In the above description on the computer, whether the power-off condition is valid is determined by the optical disc drive. The computer is instructed by change of the pin levels or instructions, to control the power supply to stop supplying power the control circuit and the drive means.

Whether the power-off condition is valid can also be determined by the computer itself. The computer according to the embodiment of the present invention can also be configured to comprise:

a power supply for supplying power to the optical disc drive comprising a drive means and a control circuit, wherein the drive means establishes an electrical connection with the power supply via the control circuit;

a power-off control module for controlling the power supply to stop supplying power to the control circuit and the drive means after receiving a power-off instruction indicating that the optical disc drive power-off condition is valid; and a power-off condition determination module for determining whether the optical disc drive power-off condition is valid and acquiring a first determination result; and transmitting the power-off instruction to the power-off control module when the determination result indicates that the optical disc drive power-off condition is valid.

By way of the above configuration, when the computer itself determines that the optical disc drive power-off condition is valid, the computer actively controls the power supply to stop supplying power to the control circuit and the drive means so that the optical disc drive is completely powered oft This power-off condition can be:

no disc exists in the tray; or the disc in the optical disc drive is not operated by the computer connected to this optical disc drive; or idle time of the optical disc drive exceeds the predetermined time.

The power-off condition can also be other conditions. The above conditions are only illustrated by way of example.

The above description of the specific embodiments of the optical disc drive and the computer is made mainly in the case of power-off. Correspondingly, the power-on should also be complete power-on. In an embodiment of the present invention, a further optical disc drive is provided, comprising:

a tray for laying a disc therein;

a drive means connected to the tray; and a control circuit for connecting the drive means and a power supply of a computer connected to the optical disc drive, wherein the drive means establishes an electrical connection with the external power supply via the control circuit;

the control circuit comprises:

a second reserved pin;

a power-on determination pin with one end electrically connected to the second reserved pin and the other end electrically connected to a power-on signal reception pin configured on a chip of the computer;

a second resistor with one end provided with a second positive voltage and the other end connected between the power-on determination pin and the second reserved pin; and a switch connected between the second reserved pin and a grounding pin;

the optical disc drive further comprises:

a key, wherein when the key is released, the switch switches off the path between the second reserved pin and the grounding pin, and when the key is pressed, the switch switches on the path between the second reserved pin and the grounding pin and instructs the computer to control the external power supply to to supply power to the optical disc drive power supply pin.

A computer is provided, comprising:

a power supply for supplying power to the optical disc drive comprising a drive means and a control circuit, wherein the drive means establishes an electrical connection with the power supply via the control circuit;

a optical disc drive usage detection module for detecting whether the optical disc drive needs to be used and acquiring a usage detection result; and a power-on control module for controlling the power supply to supply power to the control circuit and the drive means when the usage detection result indicates that the optical disc drive needs to be used.

The optical disc drive usage detection module is specifically:

a first monitoring unit for monitoring an event of operating the optical disc drive by using a hook technique, and generating the usage detection result indicating that the optical disc drive needs to be used when the event of operating the optical disc drive is detected; or a virtual optical disc drive generation unit for generating a button representing a virtual optical disc drive after stopping supplying power to the optical disc drive power supply pin; and a second monitoring unit for generating the usage detection result indicating that the optical disc drive needs to be used, when the button is clicked.

A further computer is provided, comprising:

a power supply for supplying power to the optical disc drive comprising a drive means and a control circuit, wherein the drive means establishes an electrical connection with the power supply via the control circuit;

the control circuit comprises:

a second reserved pin;

a power-on determination pin with one end electrically connected to the second reserved pin and the other end electrically connected to a power-on signal reception pin on a chip of a host;

a second resistor with one end provided with a second positive voltage and the other end connected between the power-on determination pin and the second reserved pin; and a switch connected between the second reserved pin and a grounding pin;

the optical disc drive further comprises:
a key, wherein when the key is released, the switch switches off the path between the second reserved pin and the grounding pin, and when the key is pressed, the switch switches on the path between the second reserved pin and the grounding pin;
the computer further comprises:
a second pin level detection module for detecting level information of the power-on determination pin of the optical disc drive and acquiring a second level detection result; and
a power-on control module for controlling the power supply to supply power to the control circuit and the drive means when the second level detection result indicates that a level of the power-on determination pin is a low level.

The above description is made on preferred embodiments of the present invention. It should be noted that those skilled in the art can make several modifications and variations without departing from the principle of the present invention. These modifications and variations should be considered to be within the scope of the present invention.

What is claimed is:

1. An optical disc drive, comprising:
a tray for laying a disc therein;
a drive means connected to the tray; and
a control circuit for connecting the drive means and a power supply of a computer connected to the optical disc drive, wherein the drive means establishes an electrical connection with the external power supply via the control circuit;
characterized in that the control circuit comprises:
a second reserved pin;
a power-on determination pin with one end electrically connected to the second reserved pin and the other end electrically connected to a power-on signal reception pin on a chip of the computer;
a second resistor with one end provided with a second positive voltage and the other end connected between the power-on determination pin and the second reserved pin; and
a switch connected between the second reserved pin and a grounding pin;
the optical disc drive further comprises:
a key, wherein when the key is released, the switch switches off the path between the second reserved pin and the grounding pin, and when the key is pressed, the switch switches on the path between the second reserved pin and the grounding pin and instructs the computer to control the external power supply to supply power to the optical disc drive power supply pin.

2. A computer, comprising:
a power supply for supplying power to the optical disc drive comprising a drive means and a control circuit, wherein the drive means establishes an electrical connection with the power supply via the control circuit;
the control circuit comprises:
a second reserved pin;
a power-on determination pin with one end electrically connected to the second reserved pin and the other end electrically connected to a power-on signal reception pin on a chip of a host;
a second resistor with one end provided with a second positive voltage and the other end connected between the power-on determination pin and the second reserved pin; and
a switch connected between the second reserved pin and a grounding pin;
the optical disc drive further comprises:
a key, wherein when the key is released, the switch switches off the path between the second reserved pin and the grounding pin, and when the key is pressed, the switch switches on the path between the second reserved pin and the grounding pin;
the computer further comprises:
a second pin level detection module for detecting level information of the power-on determination pin of the optical disc drive and acquiring a second level detection result; and
a power-on control module for controlling the power supply to supply power to the control circuit and the drive means when the second level detection result indicates that a level of the power-on determination pin is a low level.

* * * * *